United States Patent
De Dominicis

(10) Patent No.: US 9,879,913 B2
(45) Date of Patent: Jan. 30, 2018

(54) METHOD AND PLANT FOR CARRYING OUT THERMAL TREATMENTS OF BRAKING ELEMENTS, IN PARTICULAR BRAKE PADS

(71) Applicant: ITT ITALIA S.r.l., Lainate (IT)

(72) Inventor: Sandro De Dominicis, Barge (IT)

(73) Assignee: ITT Italia S.r.l. (IT)

( * ) Notice: Subject to any disclaimer, the term of this patent is extended or adjusted under 35 U.S.C. 154(b) by 158 days.

(21) Appl. No.: 14/782,113

(22) PCT Filed: Apr. 2, 2014

(86) PCT No.: PCT/IB2014/060386
§ 371 (c)(1),
(2) Date: Oct. 2, 2015

(87) PCT Pub. No.: WO2014/162282
PCT Pub. Date: Oct. 9, 2014

(65) Prior Publication Data
US 2016/0061524 A1     Mar. 3, 2016

(30) Foreign Application Priority Data
Apr. 3, 2013   (IT) .............................. TO2013A0270

(51) Int. Cl.
*F27B 9/00*     (2006.01)
*F27B 9/36*     (2006.01)
(Continued)

(52) U.S. Cl.
CPC ................. *F27B 9/36* (2013.01); *C21D 1/34* (2013.01); *C21D 9/0056* (2013.01);
(Continued)

(58) Field of Classification Search
CPC ... F27B 9/00; F27B 9/02; F27B 9/028; C21D 9/0056
See application file for complete search history.

(56) References Cited

U.S. PATENT DOCUMENTS 2,788,958 A * 4/1957 Tilden ................ F16D 69/0416
432/120
2,790,206 A * 4/1957 Cofek .................... B29C 31/08
264/297.3
(Continued)

FOREIGN PATENT DOCUMENTS

JP     03152387 A * 6/1991

OTHER PUBLICATIONS

International Search Report and Written Opinion for PCT/IB2014/060386; dated Aug. 12, 2014; 8 pages.

*Primary Examiner* — Gregory A Wilson
(74) *Attorney, Agent, or Firm* — Barclay Damon, LLP

(57) ABSTRACT

A method and plant for thermally treating braking elements after a forming step, including a convective heating step at 150-300° C. and a infrared irradiation heating step, immediately in succession one relative to the other. A tunnel convection furnace is crossed by at least a first conveyor belt which translates along a first direction and on an upper face of which the braking elements are placed, is arranged laterally adjacent, with respect to the first direction, to an infrared heating tunnel furnace crossed by a second conveyor belt which translates along a second direction, parallel and opposite to the first one, and on an upper face of which the braking elements are placed. The first conveyor belt is larger than the second conveyor belt, and the braking elements appear in multiple side-by-side rows in a transverse and oblique direction with respect to the first and second directions. Robots placed at the opposite ends of the furnaces transfer the braking elements from the first con-
(Continued)

veyor belt to the second one or vice versa to a first end of the furnaces and place them on the first conveyor belt or second one to a second end of the furnaces being opposite to the first one, so as to change at will the sequence in which the infrared and convective heating steps are performed.

14 Claims, 1 Drawing Sheet

(51) Int. Cl.
*F16D 69/00* (2006.01)
*C21D 9/00* (2006.01)
*C21D 1/34* (2006.01)
*F27B 9/24* (2006.01)
*F27B 9/30* (2006.01)
*F27D 11/12* (2006.01)
*F16D 69/02* (2006.01)
*F27B 9/06* (2006.01)
*F16D 69/04* (2006.01)

(52) U.S. Cl.
CPC .......... *C21D 9/0068* (2013.01); *F16D 69/00* (2013.01); *F16D 69/02* (2013.01); *F27B 9/066* (2013.01); *F27B 9/24* (2013.01); *F27B 9/243* (2013.01); *F27B 9/3005* (2013.01); *F27B 9/3077* (2013.01); *F27D 11/12* (2013.01); *F16D 2069/0491* (2013.01); *F16D 2200/0082* (2013.01); *F16D 2250/0092* (2013.01)

(56) References Cited

U.S. PATENT DOCUMENTS

| | | | |
|---|---|---|---|
| 3,058,870 A | 10/1962 | Stein | |
| 5,020,208 A * | 6/1991 | Feldmann | B21B 1/466 198/952 |
| 5,044,944 A * | 9/1991 | Furuya | F27B 9/028 432/128 |
| 5,906,485 A * | 5/1999 | Groff | A21B 1/48 432/121 |
| 8,865,058 B2 * | 10/2014 | Seals | F27B 9/028 266/241 |
| 2011/0059266 A1 | 3/2011 | Borrel | |
| 2013/0071800 A1 * | 3/2013 | Gausmann | F27B 9/022 432/11 |
| 2015/0276311 A1 * | 10/2015 | Rohr | H05B 3/0038 427/8 |

* cited by examiner

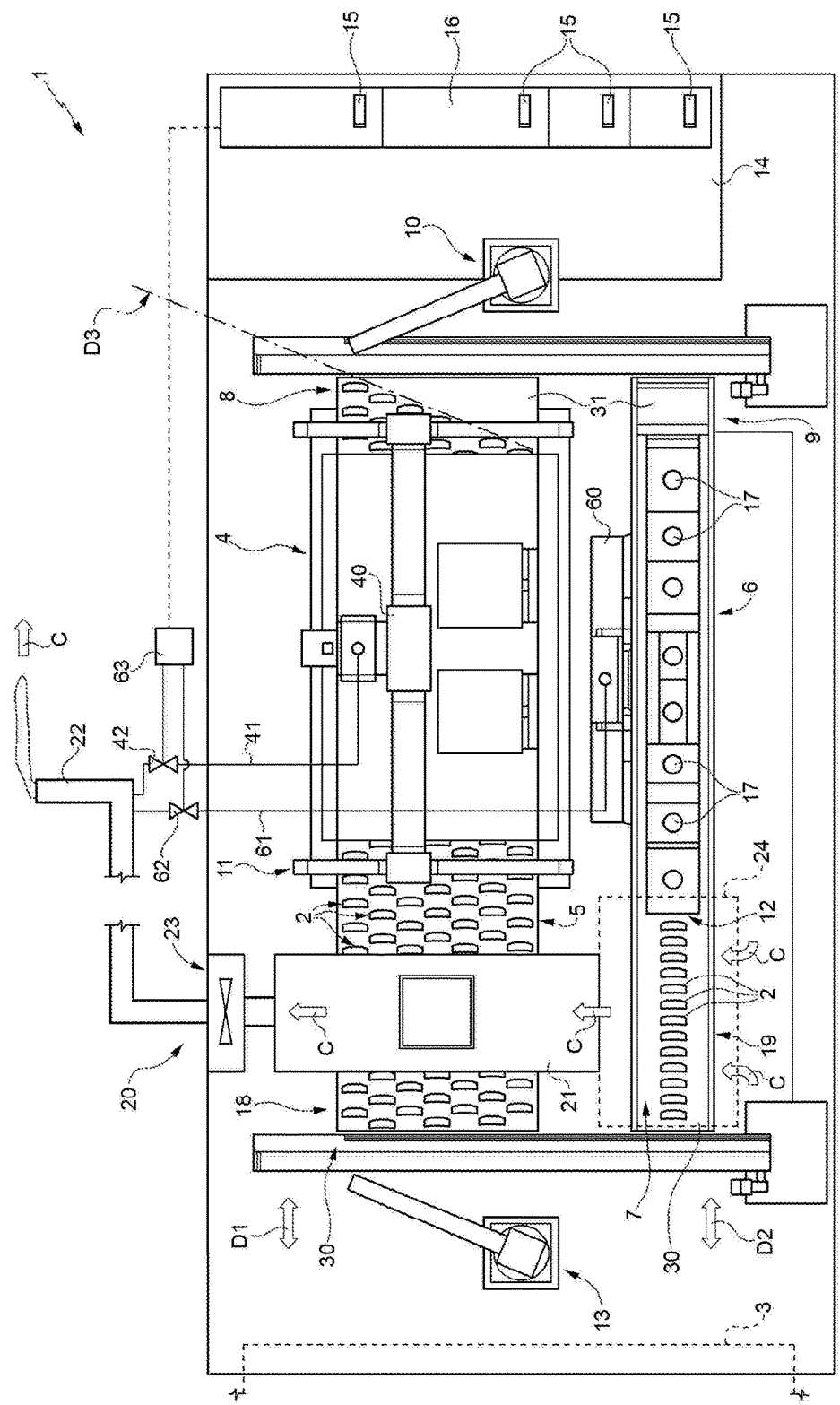

METHOD AND PLANT FOR CARRYING OUT THERMAL TREATMENTS OF BRAKING ELEMENTS, IN PARTICULAR BRAKE PADS

CROSS REFERENCE TO RELATED APPLICATIONS

This application is a national stage application under 35 U.S.C. § 371 of International Application No. PCT/IB2014/060386, filed Apr. 2, 2014, which claims priority of Italian Patent Application No. TO2013A000270, filed Apr. 3, 2013, the entire contents of each application being herein incorporated by reference.

TECHNICAL FIELD

The present invention relates to a method and plant for carrying out thermal treatments on braking elements, in particular brake pads.

BACKGROUND OF THE INVENTION

After the completion of the brake element forming step, the friction materials used as friction blocks in the brake shoes of drum brakes and as brake pads in disk brakes for vehicles and other equipment (such as clutch plates) must undergo a thermal treatment process which both enhances the characteristics of said materials and makes it possible to eliminate any residual gases.

In particular, in the case of brake pads, the pads upon leaving the forming press are heated for a certain period of time at temperatures generally slightly higher than 200° C., usually by means of convection furnaces.

However, standard thermal treatment processes employed today do not feature sufficient flexibility to allow them use the same plant to process brake pads that require thermal cycles which differ a lot one from another. These processes also feature relatively long processing cycles, which reduce the overall productivity of the plant itself.

SUMMARY OF THE INVENTION

The object of the present invention is to provide a method and a plant for carrying out thermal treatment of braking elements, in particular brake pads, which is capable of flexibly processing different types of braking elements each requiring differing performance characteristics. The present invention achieves all of this in a simple way, with reduced bulk and costs and with a relatively short processing cycle time.

The invention therefore relates to a method for thermally treating braking elements, in particular brake pads. The invention also relates to a plant for thermally treating braking elements, in particular brake pads in accordance with the claims.

The plant of the present invention can be placed immediately downstream of the braking element formation step and, according to a main aspect of the invention, is designed to carry out a combination of convective and infrared irradiation heating steps, which are carried out immediately in sequence with respect to one another. The plant therefore comprises a convection tunnel furnace that is traversed by at least one first conveyor belt moving in a first direction, the upper surface of which is designed to accommodate aligned braking elements to be treated, and an infrared heating tunnel furnace that is traversed by a second conveyor belt moving in a second direction that is parallel and opposite to the direction of the first conveyor belt, the upper surface of said second conveyor belt being designed to accommodate braking elements to be treated.

The infrared heating tunnel furnace is arranged laterally adjacent to the convection tunnel furnace, with respect to the first direction, and vice versa; in correspondence to the respective first ends of the convection and infrared heating tunnel furnaces, the first ends being arranged immediately adjacent to one another and side by side with respect to the first and second directions, the plant comprises a first robotic means for transferring the braking elements from at least the first to the second conveyor belt or vice versa; in addition, from the side of respective corresponding second ends of the convection and infrared heating tunnel furnaces, the second ends being opposite the first ends and arranged immediately adjacent and side by side with respect to the first and second directions, the plant comprises a second robotic means for arranging the braking elements on at least the first or second conveyor belt.

The braking elements are arranged at one end of one of the said first and second conveyor belts and collected at the other end, opposite the first, of the same conveyor belt in order to be transferred to an immediately adjacent end of the other conveyor belt, such that the braking elements move along at least the first and along the second conveyor belt and, during the entire combined thermal treatment process, follow a substantially U-shaped path that allows the convection and infrared heating step sequence to be changed at will simply by reversing the direction of travel of the first and second conveyor belts.

The result is an innovative and advantageous combination of infrared heating, wherein the surfaces of the elements being processed are better heated, together with convective heating, which instead better heats the centers of the elements being processed, and above all, there is the possibility to be able to change at will the sequence in which the plant performs the infrared and convective heating steps. Surprisingly, it has in fact been noted that the sequence in which these two combined but different heating steps is carried out affects the physical-mechanical and tribological properties of the treated elements.

According to a further aspect of the invention, the first conveyor belt is wider than the second conveyor belt and moves during use at a lower speed than the second conveyor belt; furthermore, the first and second robotic means are constructed and programmed so as to arrange the braking elements on the first conveyor belt in multiple rows in a transverse and oblique direction with respect to the first and second directions.

This arrangement permits compensation for the different durations of the two thermal treatment processes, which for the first time may be implemented within a single plant. Moreover, it makes possible extremely reduced plant dimensions and processing durations.

BRIEF DESCRIPTION OF THE DRAWINGS

Further features and advantages of the present invention will be clear from the description that follows of a non-limiting embodiment of the present invention which is done purely for illustrative purposes with reference to the attached drawing FIGURE, which presents a schematic longitudinal plan view of a plant for the thermal treatment of friction elements, in particular brake pads, according to the invention.

DETAILED DESCRIPTION

With reference to the single drawing attached, it is indicated as a whole with reference number 1 a plant for the thermal treatment of braking elements 2, in particular brake pads, which are known and illustrated for the sake of simplicity in schematic fashion only.

The plant 1 is preferably arranged immediately downstream of a station 3, known and indicated schematically with a hatched block, which is designed to carry out a known forming step upon the braking elements 2, comprising the pressing of a block of friction material on a metal support.

The braking elements 2 exit from the station 3 and from the corresponding forming step and are transferred to plant 1, preferably without allowing them to cool. The plant 1 is designed to expose the braking elements 2 to a combination of two heating processes, a convective heating process and an infrared heating process, immediately following each other.

To this end the plant 1 comprises in combination: a convection tunnel furnace 4, known in the art and therefore for the sake of simplicity not described in detail, said furnace 4 being traversed by at least one first conveyor belt 5 of any known type that moves in a first direction D1 and has an upper surface which is designed to accommodate the braking elements to be treated; and a conventional type infrared heating tunnel furnace 6, whose realization is obvious for those skilled in the art and for which reason for the sake of simplicity will not be described in detail, that is traversed by a second conveyor belt 7 that moves in a second direction D2 which is parallel and opposite to the first direction D1, and that has an upper surface which is designed to accommodate the braking elements 2 to be treated.

Both directions D1 and D2, which are rectilinear in the illustrated example, can be traveled by the braking elements 2 present on the conveyor belts 5 and 7 in both of the two possible versus directions, as indicated by the arrows, i.e., either away from the station 3 or towards the station 3, inasmuch as the conveyor belts 5 and 7 are driven in such a way that they can be reversed during operation. According to the invention, however, the conveyor belt 5 is always driven such that it moves the elements 2 along direction D1 in a versus which is always opposite to that in which conveyor belt 7 moves the braking elements 2 along the second direction D2, and vice versa.

The infrared heating tunnel furnace 6 is arranged according to the invention to be laterally adjacent, with respect to direction D1, to the convection furnace 4; furthermore, in correspondence to respective first ends 8 and 9 of the convection furnace 4 and infrared heating tunnel furnace 6, which first ends 8 and 9 are arranged to be immediately adjacent to one another and side by side with respect to the first and second directions D1 and D2, the plant 1 comprises a first robotic means 10 for transferring the braking elements 2 (one or two elements at a time) from the first conveyor belt 5 to the second conveyor belt 7 or vice versa.

On the contrary, on the side of respective, corresponding second ends 11 and 12 of the convection tunnel furnace 4 and infrared heating tunnel furnace 6, which second ends are opposite the first ends 8 and 9 and are arranged immediately adjacent and side by side with respect to the first and second directions D1 and D2, the plant 1 comprises a second robotic means 13 for arranging the braking elements 2 on the first conveyor belt 5 or on the second conveyor belt 7, in the illustrated example this being as soon as the braking elements 2 exit the station 3 having completed the forming step.

Given that the versus in which the conveyor belts 5 and 7 move the braking elements 2 to be treated along directions D1 and D2 is reversible, the robotic means of manipulation 10 and 13 arranged in correspondence with the respective opposite adjacent ends 8,9 and 11,12 of the conveyor belts 5 and 7 allow the sequence in which the plant 1 performs the combined steps of convective and infrared heating to be changed at will. This means that the braking elements 2 leaving the station 3 may indifferently be sequentially subjected first to a convective heating step by passing them through the furnace 4 and then to an infrared heating step by passing them through the furnace 6, or first to an infrared heating step through the furnace 6 and then to a convective heating step through the furnace 4.

According to the invention, at least the first conveyor belt 5 is wider than the second conveyor belt 7, that is, in a direction transverse to directions D1 and D2, it has a greater width than that of the conveyor belt 7 and when in use moves at a lower speed than that of the conveyor belt 7; clearly, the same result can be obtained using a plurality of narrower conveyor belts 5, arranged side by side and operating at the same speed. In any case, however, the conveyor belts 5 and 7 have substantially the same length, i.e., in a direction parallel to directions D1 and D2, they have substantially the same dimensions.

Moreover, the first and second robotic means 10 and 13 are designed to arrange the braking elements 2 on the first conveyor belt 5 in multiple rows, according to an array in the illustrated example with the rows arranged parallel to directions D1 and D2 and the columns arranged transversely with respect to directions D1 and D2, as clearly illustrated in the FIGURE of the accompanying drawing. According to the invention, the robotic means 10 and 13 are designed to arrange the braking elements 2 on the conveyor belt 5 according to columns which are oriented in a direction D3 (indicated by the dash-dot line), not only transversely, but also obliquely, and therefore, inclined by a certain angle other than either zero or 90°, with respect to directions D1 and D2. The braking elements 2 may be arranged aligned in direction D3, as shown in the FIGURE, or, for example to save space and reduce overall dimensions, they can be arranged in that direction in a "zig-zag" fashion, thus assuming positions that are partially overlapping in a direction that is perpendicular to directions D1 and D2, such that a greater number of braking elements 2 can be arranged over the entire width of the conveyor belt 5.

To this end, for example, the robotic means of manipulation 10 and 13 in the illustrated example comprise an articulated robotic arm fitted with suitable pincers designed to grip different types of brake elements 2. Said robotic arms are controlled by a control unit 14 via a series of cameras 15 arranged on a frame 16 positioned above furnaces 4 and 6 and on the side of ends 8 and 9.

The convection tunnel furnace 4 is of any known type that is designed to heat braking elements to a temperature between 150 and 300° C.; vice-versa, the infrared heating tunnel furnace 6 is equipped with radiant infrared means, in this case in point a plurality of lamps 17 arranged in sequence in direction D2 and designed to produce infrared irradiation having a power density between 50 and 150 $kW/m^2$ that is directed towards the braking elements 2 during the infrared irradiation heating step.

According to a further aspect of the invention, in correspondence with the second ends 11 and 12 of the furnaces 4 and 6, the first and second conveyor belts 5 and 7 have corresponding respective termination stretches or sections 18 and 19 placed immediately adjacent and alongside one another and external to the respective tunnel furnaces 4 and 6; situated at the free end 30 of each of the sections 18 and 19 of conveyor belts 5 and 7 that face towards the station 3 and immediately adjacent to the same are the robotic manipulator means 13, which are therefore arranged between the station 3 and termination sections 18 and 19.

Corresponding to stretches/sections 18 and 19 of the conveyor belts 5 and 7, the plant 1 comprises means, indicated as a whole by reference number 20, for generating a forced ambient air current C whose orientation and direction are indicated by the arrows and which is designed to pass over the conveyor belt 7 and lap braking elements 2 that are arranged upon same; said means 20 are also designed to subsequently direct the forced air current C within a box-like element 21 through which passes conveyor belt 5 and, during use, the braking elements 2 arranged on conveyor belt 5 and to vent; downstream of the box-like element 21 with respect to the direction of movement of the forced air current, which is indicated by the arrows, there are then arranged means 22 for discharging the forced air current C into the surrounding environment.

Said means 20 comprise a suction fan 23 that is positioned downstream of the box-like element 21 with respect to the direction of movement of the forced air current C. In practice, a hood 24 is positioned over section 19 of conveyor belt 7 (indicated by a broken line), said hood being hydraulically connected, transverse to directions D1 and D2, with the box-like element 21; said box-like element is in its turn hydraulically connected to the fan 23, which is connected by a tube 22 to the atmosphere. The hood 24 can be omitted and replaced by simple air intakes connected to the box-like element 21 and arranged in the immediate vicinity (opposite) of portion 19 of the conveyor belt 7.

Conveyor belts 5 and 7 terminate opposite station 3, with their respective corresponding adjacent ends 31, which are opposite the ends 30 and which protrude from furnaces 4 and 6, opposite the station 3.

By means of the described plant 1, it is possible to implement a method to quickly and flexibly perform thermal treatment processing on braking elements 2, in particular brake pads, preferably immediately downstream of a brake pad or braking element 2 forming step performed within the station 3 in a known way, comprising a combination of convective and infrared irradiation heating steps being performed on the braking elements 2, said steps being performed immediately in sequence with respect to one another; the convective heating step is performed within the convection tunnel furnace 4, which is longitudinally traversed by at least one conveyor belt 5 that moves in direction D1 and upon the upper surface of which the braking elements 2 are aligned such that they also pass through the furnace 4 for the entire length of the same.

The infrared heating step is performed within the infrared heating tunnel furnace 6, which is positioned, with respect to direction D1, laterally adjacent to the convection tunnel furnace 4 and is traversed by the conveyor belt 7, which moves in a second direction D2, parallel and opposite to direction D1, and upon the upper surface of which the braking elements are aligned 2.

The braking elements 2 are arranged at one end 30 of anyone of the said first and second conveyor belts 5 and 7 and collected at the other end 31, opposite the first end 30, of the same conveyor belt in order to be transferred to the other immediately adjacent end 31 of the conveyor belts 5,7, such that the braking elements 2 move along the said first and second conveyor belts 5 and 7, and during the entire thermal treatment process a substantially U-shaped path is followed that allows the sequence of the convection and infrared heating steps to be changed at will simply by reversing the direction of travel of the first and second conveyor belts 5 and 7.

During the convective heating step, the braking elements 2 are brought up to a temperature between 150 and 300° C. and, in combination, the braking elements 2 during the infrared irradiation heating step, which is always performed consecutively with respect to the convective heating step, are subjected without intermediate cooling to infrared irradiation having a power density between 50 and 150 kW/m$^2$.

The convective and infrared heating steps are each performed unidirectionally, by moving the braking elements 2, preferably in a rectilinear direction, such as directions D1 and D2, while keeping all of the elements arranged on the same plane as defined by one upper surface of the corresponding first and second conveyor belts 5 and 7.

The convective heating step is performed within a time interval of between 30 and 150 minutes, while the infrared irradiation heating step is performed within a time interval of between 1 and 10 minutes; conveyor belts 5 and 7 are consequently made to move at different speeds and the braking elements 2 are arranged side by side on at least the first conveyor belt 5 according to a plurality of transverse rows (aligned in the direction D3 or with the elements 2 in a zig-zag arrangement), the rows extending in a transverse and oblique direction with respect to direction D1, i.e., according to direction D3, so as to compensate for the difference in speed between the first and second belts 5 and 7, thus feeding the same number of braking elements 2 per unit time through the convection tunnel furnace 4 and through the infrared heating tunnel furnace 6.

The transfer of the braking elements 2 from the first conveyor belt 5 to the second conveyor 7 and vice versa is performed by one or more robotic manipulators 10 controlled by a series of cameras 15 each having an identical viewing angle along opposing directions D1 and D2, i.e., in correspondence with the end 31.

The braking elements 2 are made to pass, respectively, upstream or downstream of the infrared heating and convective tunnel furnaces 4 and 6 with respect to the first direction D1 or the second direction D2, along sections 18,19 immediately adjacent, parallel and alongside, conveyor belts 5 and 7 and along which path the braking elements 2 present on the second conveyor belt 7 are passed over (while crossing beneath the hood 24 which is positioned over at least conveyor belt 7) by the forced ambient air current C, which is then directed within the box-like element 21 that is traversed by conveyor belt 5 and the braking elements 2 arranged upon the latter, to be subsequently discharged downstream of the box-like element 21 with respect to a direction of movement of the forced air current C.

Depending on which of the two types of heating steps, convective or infrared, is performed first, the resulting brake pads 2 feature different behavioral characteristics during use, regarding for example the so-called "fade" property. All told, the combined convection/infrared thermal treatment is also faster than the normal convective heating thermal treatment. The complete thermal treatment process is performed continuously, without cooling of the braking elements and with considerable energy savings. Finally, the presence of the box-like element 21, which is traversed by the air current C, makes it possible, in the case in which the elements 2 exiting from the station 3 are immediately fed onto the conveyor belt 5 and the convective heating step is performed first, to provide a uniform temperature for the braking elements 2 entering the furnace 4, with consequent improvement in the quality of thermal treatment itself. The forced air C that passes over the conveyor belt 7 further serves to cool the elements 2 exiting the furnace 6 at the end of the processing cycle.

Vice versa, in the opposite case in which the elements 2 are first fed to conveyor belt 7, the box-like element 21 allows for rapid cooling at the end of the processing cycle, while the hood 24 serves to equalize the temperature of the elements 2 entering the furnace 6.

Finally, it is to be noted that, according to a further aspect of the invention and thanks to the configuration or lay-out described, it is possible to produce a plant 1 that has a single chimney or exhaust to the atmosphere 22. To this end the furnaces 4 and 6 have respective suction hoods for any fumes that may be generated within them, indicated respectively by the reference numbers 40 and 60. The furnace hoods 40 and 60 are connected by respective exhaust tubes 41 and 61, shown only schematically within the FIGURE by their respective lines; the tubes 41 and 61 converge separately or together within the tube or chimney 22 that discharges into the atmosphere and are equipped downstream of the said convergence with the tube 22, with respective control valves 42,62 which serve to adjust the exhaust flow rate towards the tube or chimney 22; valves 42,62 are controlled by a control unit 63, which is connected to control unit 14.

A further advantage of the plant described above and owing to the use of tunnel furnaces 4,6 and associated conveyor belts 5,7, which are arranged side by side, is that temperature sensors (for quality control verification) can be arranged on the conveyor belts 5 and 7 within the furnaces 4,6 while operating, inasmuch as the sensor signal connector cables leading out from the furnaces 4,6 can be run out in a straight line along the conveyor belts 5,7 and subsequently collected upon completion of the thermal treatment process.

The purposes of the invention are therefore fully achieved.

The invention claimed is:

1. A method for thermally treating braking elements comprising, in combination, a convective heating step and an infrared irradiation heating step, each of said steps being carried out immediately in sequence with respect to one another wherein the convective heating step is carried out in a tunnel convection furnace crossed by at least a first conveyor belt which translates along a first direction (D1) and on an upper face of which the braking elements are placed; and
    wherein the infrared irradiation heating step is carried out in a tunnel furnace with infrared heating arranged laterally adjacent, with respect to the first direction, to the tunnel convection furnace and crossed by a second conveyor belt which translates along a second direction (D2), parallel and opposite to the first direction, and on an upper face of which the braking elements are placed;
    said braking elements being arranged on a first end of one of said first and second conveyor belts and collected at a second end, opposite to the first end, of the same conveyor belt to be transferred on an immediately adjacent end of the other of said first and second conveyor belts, so that the braking elements follow, along said first and second conveyor belts and during the entire execution of the thermal treatment, a substantially U-shaped path which allows the sequence at which the convective and the infrared heating steps are carried out to be changed as desired by simply reversing the running direction of the first and second conveying belts.

2. A method according to claim 1, in which the braking elements are taken to a temperature from 150 to 300° C. during the convective heating step and in combination, the braking elements are subjected to an infrared irradiation having a power density from 50 to 150 kW/m$^2$ during the infrared irradiation heating step.

3. A method according to claim 1, wherein the convective heating and the infrared irradiation heating steps are each carried out with a unidirectional path, moving the braking elements, and keeping them all arranged on the same plane defined by an upper face of the corresponding first and second conveyor belts.

4. A method according to claim 3, wherein the braking elements are moved in a rectilinear direction.

5. A method according to claim 1, wherein the convective heating step is carried out in a time interval between 30 and 150 minutes, while the infrared irradiation heating step is carried out in a time interval between 1 and 10 minutes; said first and second conveyor belts being accordingly moved at different speeds and the braking elements being arranged on at least the first conveyor belt according to a plurality of side-by-side transversal rows which extend in transversal and slanting direction (D3) with respect to said first direction, so as to compensate for the difference in speed between the first and the second conveyor belt and feed the same number of braking elements per time unit through the tunnel convection furnace and through the tunnel furnace with infrared heating.

6. A method according to claim 5, wherein the transfer of the braking elements from the first to the second conveyor belt and vice versa is carried out by means of at least one handling robot controlled by a series of cameras and having an identical pick up position along said first and second directions (D1, D2), opposite to each other.

7. A method according to claim 1, wherein the braking elements are passed, upstream or downstream of said tunnel convection and infrared heating furnaces respectively, with respect to the first or to the second direction, along immediately adjacent, parallel and side-by-side stretches/sections of the first and second conveyor belts, along which the braking elements present on the second conveyor belt are lapped by a forced ambient air current (C), which is then directed into a box-shaped element crossed by the first conveyor belt and by the braking elements arranged on the latter and then vented, downstream of the box-shaped element with respect to a moving direction of said forced air current.

8. A method according to claim 1, wherein the braking elements are braking pads and in which the method is performed immediately downstream of a pad forming step.

9. A plant for thermally treating braking elements said plant being configured to carry out, in combination, on the braking elements a convective heating step and an infrared irradiation heating step, immediately in sequence with respect to one another, and comprising:
    a tunnel convection furnace crossed by at least a first conveyor belt which translates along a first direction (D1) and having an upper face adapted to accommodate the braking elements to be treated;
    an infrared heating tunnel furnace crossed by a second conveyor belt which translates along a second direction (D2), parallel and opposite to the first conveyor belt, and having an upper face adapted to accommodate the braking elements to be treated; the infrared heating tunnel furnace being arranged laterally adjacent, with respect to the first direction, to said tunnel convection furnace;

first robot means for transferring the braking elements from the first conveyor belt to the second conveyor belt or vice versa at respective corresponding first ends of the tunnel convection furnace and infrared heating tunnel furnace, arranged immediately adjacent and side by side with respect to the first and second directions;

second robot means for arranging the braking elements on the first or on the second conveyor belt on the side of respective, corresponding second ends of said tunnel convection furnace and arranged immediately adjacent and side by side with respect to the first and second directions, so as to change the sequence at which the plant carries out the convective and infrared heating steps as desired.

10. A plant according to claim 9, wherein the first conveyor belt is larger than the second conveyor belt, and in use, the first conveyor belt moves at a lower speed than the second conveyor belt, the first and second robot means being adapted to arrange the braking elements on the first conveyor belt in multiple side-by-side rows aligned in a transversal and slanting direction (D3) with respect to the first and second directions (D1, D2) or zigzag arranged along the slanting direction (D3).

11. A plant according to claim 9 wherein the tunnel convection furnace is adapted to heat the braking elements to a temperature from 150 to 300° C.; and in that, in combination, the infrared heating tunnel furnace is provided with infrared radiating means adapted to develop, during the infrared irradiation heating step, an infrared irradiation having a power density from 50 to 150 kW/m$^2$.

12. A plant according to claim 9 in which at the second ends of said tunnel convection furnace and infrared heating tunnel furnace, said first and second conveyor belts have corresponding stretches/sections arranged immediately adjacent and side by side to each other and outside the tunnel furnaces; at said side-by-side stretches of the conveyor belts, the plant comprising means for generating a forced ambient air current (C) adapted to lap the second conveyor belt and the braking elements arranged thereon and for then directing said forced air current within a box-shaped element crossed by the first conveyor belt and by the braking elements arranged on the latter; and means for venting the forced air current to the environment being arranged downstream of the box-shaped element with respect to a moving direction of said forced air current.

13. A plant according to claim 12, wherein said means for generating said forced ambient air current comprise a suction fan arranged downstream of the box-shaped element with respect to a moving direction of said forced air current.

14. A plant according to claim 9, wherein the braking elements are braking pads and in which the plant is positioned downstream from the formation of the braking elements.

* * * * *